US009346230B2

(12) United States Patent
Calvel et al.

(10) Patent No.: US 9,346,230 B2
(45) Date of Patent: May 24, 2016

(54) MOLDING ELEMENT FOR A TIRE MOLD COMPRISING A POROUS AREA

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Romain Calvel, Clermont-Ferrand (FR); Etienne Blanchet, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges Paccot (CH)

( * ) Notice: Subject to any disclaimer, the term of this patent is extended or adjusted under 35 U.S.C. 154(b) by 0 days.

(21) Appl. No.: 14/436,732

(22) PCT Filed: Oct. 1, 2013

(86) PCT No.: PCT/EP2013/070395
§ 371 (c)(1),
(2) Date: Apr. 17, 2015

(87) PCT Pub. No.: WO2014/060209
PCT Pub. Date: Apr. 24, 2014

(65) Prior Publication Data
US 2016/0039160 A1    Feb. 11, 2016

(30) Foreign Application Priority Data
Oct. 17, 2012   (FR) ...................................... 12 59902

(51) Int. Cl.
B29D 30/06   (2006.01)
B22F 3/105   (2006.01)
(Continued)

(52) U.S. Cl.
CPC .......... *B29D 30/0606* (2013.01); *B22F 3/1055* (2013.01); *B29C 33/10* (2013.01);
(Continued)

(58) Field of Classification Search
CPC ................... B29D 30/0606; B29D 2030/0612; B29D 2030/0614; B29D 2030/0617; B29C 33/10; B29C 33/3814
See application file for complete search history.

(56) References Cited

U.S. PATENT DOCUMENTS 3,804,566 A * 4/1974 Kimura ................... B29C 33/10
                                                   249/141
5,431,873 A   7/1995 Vandenberghe
(Continued)

FOREIGN PATENT DOCUMENTS

DE          42 43 962     *  6/1994
DE         102004028462     12/2005
(Continued)

OTHER PUBLICATIONS

International Search Report for PCT/EP2013/070395 dated Jan. 20, 2014.

*Primary Examiner* — James Mackey
(74) *Attorney, Agent, or Firm* — Dickinson Wright PLLC

(57) ABSTRACT

A molding element for a tire mold manufactured from a metallic powder fused together layer by layer. The molding element contains a first surface intended to mold all or part of a tread surface of the tire and a second surface opposite to the first surface and intended to be in contact with another part of the mold. The thickness (E) of the molding element is between 1 and 6 millimeters. The molding element overall has a density greater than or equal to 98%. The molding element also contains at least one first porous area extending into the thickness of this molding element, this first porous area having a plurality of pores allowing air to pass between the first surface of the molding element and the second surface thereof.

5 Claims, 3 Drawing Sheets

(51) Int. Cl.
   *B29C 33/38*  (2006.01)
   *B29C 33/10*  (2006.01)
(52) U.S. Cl.
   CPC .... *B29C 33/3814* (2013.01); *B29D 2030/0612* (2013.01); *B29D 2030/0614* (2013.01); *B29D 2030/0617* (2013.01)

(56) References Cited

U.S. PATENT DOCUMENTS

| | | |
|---|---|---|
| 2001/0048182 A1 | 12/2001 | Caretta et al. |
| 2002/0119209 A1 | 8/2002 | Tanaka |
| 2006/0188593 A1 | 8/2006 | Tanaka |
| 2009/0162465 A1* | 6/2009 | Komornik .............. B22F 3/1109 425/47 |
| 2011/0318532 A1 | 12/2011 | Dusseaux |

FOREIGN PATENT DOCUMENTS

| | | |
|---|---|---|
| DE | 102004052766 | 5/2006 |
| EP | 0868955 | 10/1998 |
| WO | 2010076502 | 7/2010 |

* cited by examiner

MOLDING ELEMENT FOR A TIRE MOLD COMPRISING A POROUS AREA

This application is a 371 national phase entry of PCT/EP2013/070395, filed 1 Oct. 2013, which claims benefit of French Patent Application No. 1259902, filed 17 Oct. 2012, the entire contents of which are incorporated herein by reference for all purposes.

BACKGROUND

1. Field

The present disclosure relates to a molding element obtained by sintering and comprising particular venting means. The molding element is intended to be arranged in a tire mold, notably a mold of the segmented type. The invention also relates to a method for producing such a molding element.

2. Description of Related Art

A segmented mold comprises several separate parts which, when brought relatively closer together, delimit a molding space of toroidal overall shape. In particular, a segmented mold comprises two lateral shells for molding the sidewalls of the tire and several peripheral segments situated between the shells for molding the tread of the tire. All of these parts are brought closer together with suitable dynamics thanks to a determined mechanism.

In order to mold the tread, the mold segments comprise molding elements. What is meant by a molding element is an element of the mold which comprises a molding surface that allows part of the tread of a tire to be molded.

It is possible to create a molding element using a selective fusion method more commonly referred to as sintering. This method uses a beam of energy to fuse a metallic powder. A "beam of energy" means electromagnetic radiation (for example a laser beam) or a beam of particles (for example an electron beam).

A sintering method using a laser, hereinafter referred to as a laser sintering method, is known from document EP1641580. In that document, a first layer of metallic powder is spread on a plate. All or some of the particles of this first layer of powder are then agglomerated by the beam of a laser according to the shape of the object that is to be obtained. Once this step has been performed, a second layer of powder is spread on the first layer of powder so that it in turn can be selectively fused using the laser. By repeating these operations of spreading layers and fusing using a laser, a sintered object is built up layer by layer.

Document WO2010/076502 discloses a particular molding element obtained using this laser sintering technique. This molding element, referred to as a skin, is of small thickness and is intended to be placed in a mold. In order to avoid air being trapped between the mold and a green tire during a vulcanizing operation, it is necessary to provide venting means in the molding element.

Documents DE102004028462 and DE102004052766 disclose examples of venting means. More particularly, these documents disclose a mold part comprising a molding element obtained by laser sintering and an interface element interfacing with the rest of the mold. This interface element is not sintered and is secured to the molding element. The molding element throughout its volume comprises a plurality of pores forming small-sized cavities. These cavities are able to guide the air towards drillings formed in the interface element and opening to the rear of this interface element. However, the presence of a high number of pores in the molding element reduces the material density of this element and makes it more fragile to mechanical loading. Thus, the venting solutions disclosed in documents DE102004028462 and DE102004052766, if applied to the molding element of document WO2010/076502, would make the latter element too fragile because of its small thickness. Furthermore, in documents DE102004028462 and DE102004052766, it is necessary to provide an additional operation of making a hole in the interface element.

There is therefore a need to offer a simple and economical venting solution for a molding element obtained by laser sintering and of small thickness.

DEFINITIONS

A "tire" means all types of resilient tread whether or not it is subjected to an internal pressure.

A "tread" of a tire means a quantity of rubbery material delimited by lateral surfaces and by two main surfaces one of which is intended to come into contact with a roadway when the tire is running.

A "cut" in a tread means the space delimited by walls of material that face one another and are distant from one another by a non-zero distance.

A "mold" means a collection of separate parts which, when brought relatively closer together, are able to delimit a toroidal molding space.

A "molding element having a density greater than or equal to 98%" means that the volume of voids, formed for example by pores in the molding element, is less than 2%.

A "porous area" in the molding element means an area of the molding element that comprises a plurality of pores generating a voids volume of more than 20% in this area.

A "pore" means a cavity of spherical overall shape with a diameter comprised between 10 and 200 microns.

A "pattern" on the tire means a decoration on this tire capable of improving its overall appearance and/or of providing technical or legal information regarding this tire.

SUMMARY

The invention, in an embodiment, relates to a molding element for a tire mold manufactured from a metallic powder fused together layer by layer. This molding element comprises a first surface intended to mold all or part of a tread surface of the tire and a second surface opposite to the first surface and intended to be in contact with another part of the mold, the thickness of the molding element being comprised between 1 and 6 millimeters, the molding element overall having a density greater than or equal to 98%. The molding element comprises at least one first porous area extending into the thickness of this molding element, this first porous area comprising a plurality of pores allowing air to pass between the first surface of the molding element and the second surface thereof.

The first porous area allows air to pass between the inside of the mold and the outside of this mold when the latter is closed. Because the overall density of the molding element remains greater than or equal to 98% despite the presence of this first porous area, good removal of air from the mold during the vulcanizing operation is ensured while at the same time maintaining good mechanical strength of the molding element.

In one preferred embodiment, the first porous area forms a marking on the molding element, this marking being able to mold a pattern on the tire.

By organizing the first porous area in such a way that it is able to create a predefined pattern on the tire, the overall appearance of the tire is improved.

In one alternative form of embodiment, the molding element comprises a lateral surface connecting the first surface of this element to the second surface thereof. The molding element also comprises a second porous area connecting the first porous area of the molding element to the lateral surface of this element, this second porous area forming all or part of the second surface of the molding element.

The second surface of the molding element will come into contact with another part of the mold. Contact between the molding element and this other part is not generally entirely airtight. By creating a second porous area in the molding element at the interface with the other part of the mold, the removal of air from the mold is improved without the need to make a hole in the other part of the mold. This then makes the mold easier to manufacture.

In one alternative form of embodiment, the molding element comprises a plurality of protrusions projecting from the first surface and intended to mold cuts in the tread of the tire. At least two protrusions of the plurality of protrusions intersect on the first surface, and the first porous area opens onto the first surface at the intersection of the two protrusions.

The point at which two protrusions intersect on the first surface of the element is particularly critical because a large amount of air can build up at this point as the mold is closed over the green tire. By making the porous area open onto the intersection of two protrusions, it becomes easier to remove air from the mold and the appearance of surface defects on the tread once this tread has been vulcanized is limited.

Another subject of the invention is a method for the layer-by-layer manufacture of a molding element for a tire mold. The molding element comprises a first surface intended to mold all or part of a tread surface of the tire and a second surface opposite to the first surface and intended to be in contact with another part of the mold. The thickness of the molding element is comprised between 1 and 6 millimeters, and this molding element overall has a density greater than or equal to 98%. The method of manufacture comprises a plurality of steps of applying layers of metallic particles and of agglomerating all or some of the particles of these layers by fusion. For each of the layers of the molding element, a porous part is created during the step of agglomerating the particles, the porous parts of the various layers of the molding element being superposed with one another to form a continuous porous area extending into the thickness of the molding element.

BRIEF DESCRIPTION OF THE DRAWINGS

Other features and advantages of embodiments of the invention will become apparent from the following description, given by way of nonlimiting example, with reference to the attached drawings in which.

DETAILED DESCRIPTION OF SPECIFIC EMBODIMENTS

In the description which follows, elements which are substantially identical or similar will be denoted by identical references.

Figure 1:
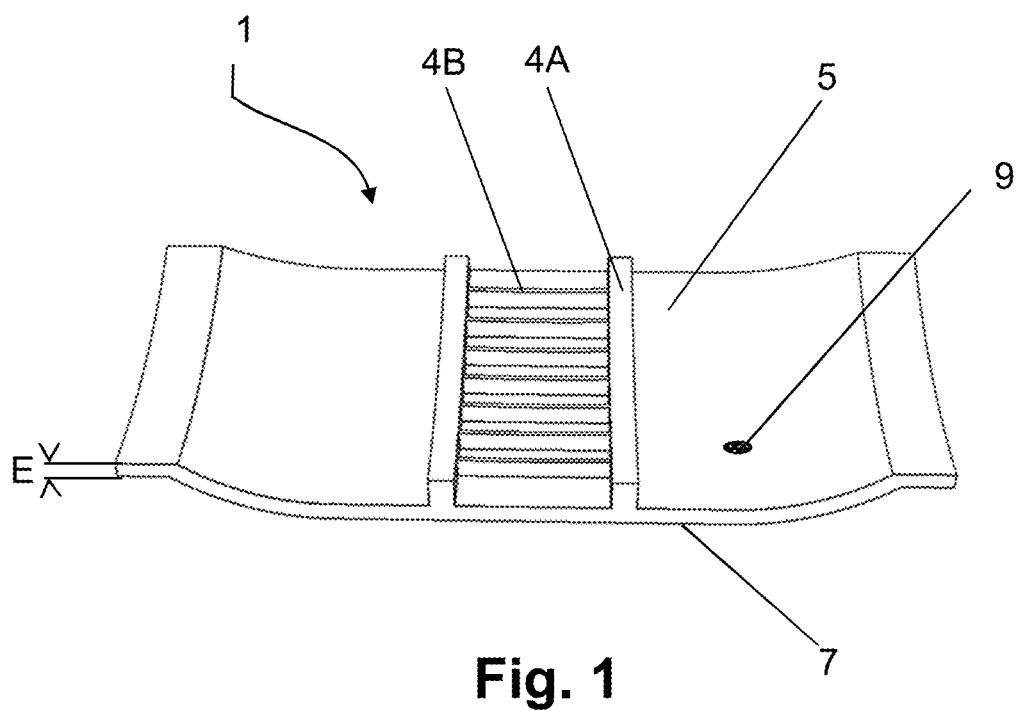
FIG. 1 is a perspective view of a molding element according to an embodiment of the invention.

FIG. 1 is a perspective view of a molding element 1 manufactured from a metallic powder fused together layer by layer. This molding element comprises a body 3 and protrusions 4A, 4B protruding from this body 3. Among these protrusions, a distinction is made in particular between bars 4A and sipe blades 4B which are perpendicular in this case to the bars 4A. A "bar" means a protrusion the width of which is greater than or equal to 2 mm. A bar is intended to mold a groove in a tread of a tire. A "sipe blade" means a protrusion the width of which is less than 2 mm A sipe blade is intended to mold a sipe in the tread of the tire.

The body 3 also comprises a first surface 5 and a second surface 7 opposite to the first surface 5. The first surface 5 is intended to mold all or part of a tread surface of a tire and the second surface 7 is intended to come into contact with another part of the mold in which the molding element 1 is attached. The first surface 5 and the second surface 7 define the thickness E of the body 3. This thickness E is comprised between 1 and 6 millimeters. For preference, this thickness is comprised between 2 and 2.5 millimeters. This small thickness gives the molding element a lightness of weight and a flexibility that make it easier to position and hold in place when attached in another mold part.

It will be noted that the molding element here has a density greater than or equal to 98%. This density may be determined by different methods. One of these methods is to cut the molding element 3 into various sections, for example ten sections or so, in planes perpendicular to the bars 4A. For each face of the sections which is formed by the cut, this face is polished using an abrasive disc. This polishing step thus makes it possible to reduce the surface roughness of the face, and this makes the porous parts of the molding element that open onto this face more visible. The face is then photographed and this photograph is processed using image processing software. This software notably makes it possible to obtain a processed photo showing dark areas corresponding to the porous parts and light areas corresponding to the non-porous parts, namely to the polished parts. The ratio between the surface area of the light areas and the total surface area of the face makes it possible to determine the density for the cross section of the molding element associated with this face. By repeating these operations of polishing, photographing and image processing for the various sections of the molding element and by averaging the results obtained, it is possible to determine the overall density of this molding element.

In an alternative method for determining the density of the molding element, the molding element 3 is cut along the length of the bar 4A. The face formed by this cut is then polished then the porosity on this face is observed at 10 predetermined areas on this face.

Figure 2:
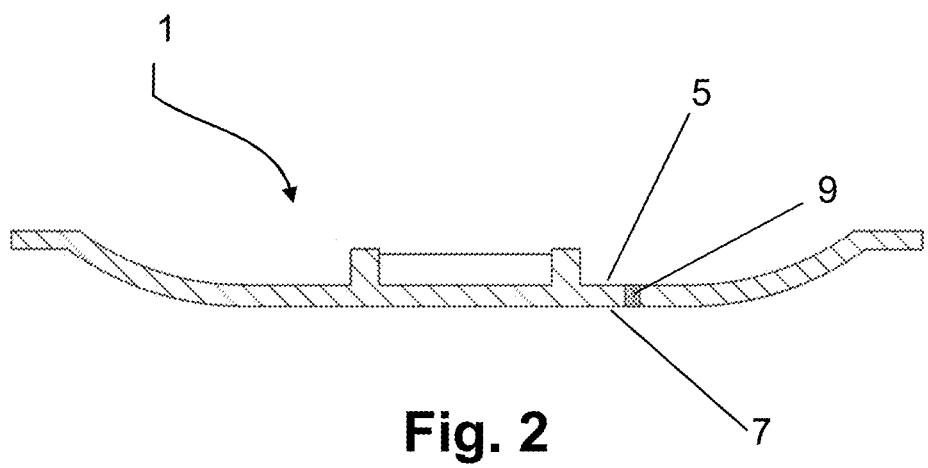
FIG. 2 schematically depicts a view in cross section of the molding element of FIG. 1 according to a first embodiment.

The molding element 1 comprises a first porous area 9. As can be seen in FIG. 2, this first porous area 9 extends into the thickness of the molding element 1 and thus connects the first surface 5 to the second surface 7. This porous area 9 comprises a plurality of pores allowing air to pass between the first surface 5 and the second surface 7. The quantity of pores in the porous area is such that this porous area has a density of less than 80%.

Figure 3:
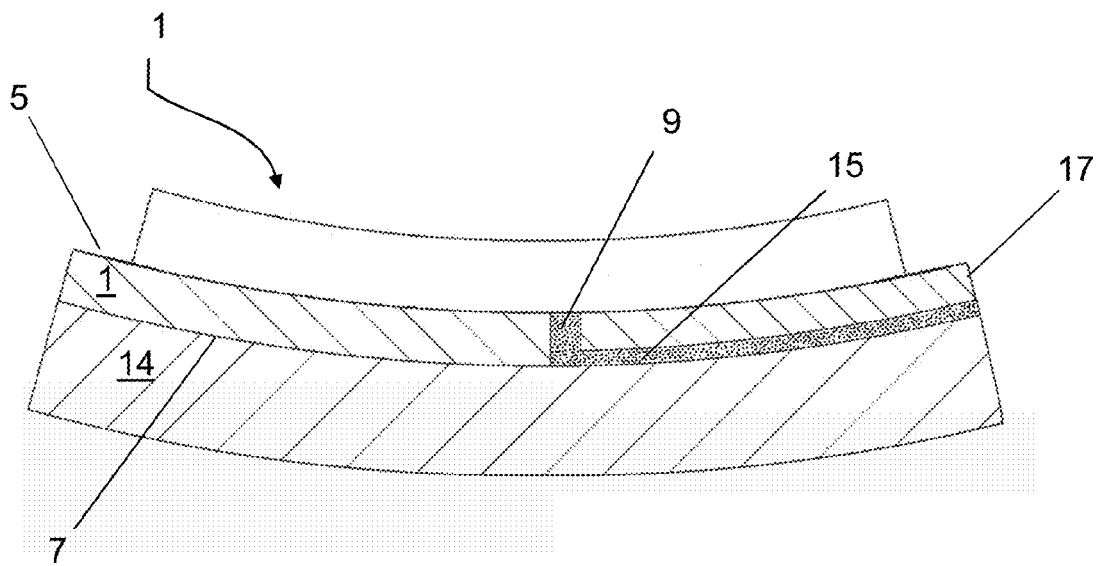
FIG. 3 schematically depicts a view in cross section, in a plane perpendicular to the plane of FIG. 2, of the molding element of FIG. 1 according to a second embodiment.

FIG. 3 is a view in cross section of the molding element 1 of FIG. 1 according to a second embodiment, in a plane perpendicular to the plane of FIG. 2. The molding element 1 is depicted here as being an element attached to another part 14 of the mold. More specifically, in this embodiment, the molding element 1 comprises a second porous area 15. This second porous area 15 here forms part of the second surface 7 of the molding element 1. More particularly, this porous area 15 connects the cavity 9 to a lateral surface 17 of this molding element 1. The lateral surface 17 is the surface of the element 1 that connects the first surface 5 to the second surface 7. In this way, air is removed from the mold via the first porous area 9 and the second porous area 15 and this is done without the need to make a hole in the other part 14 of the mold.

Figure 4:
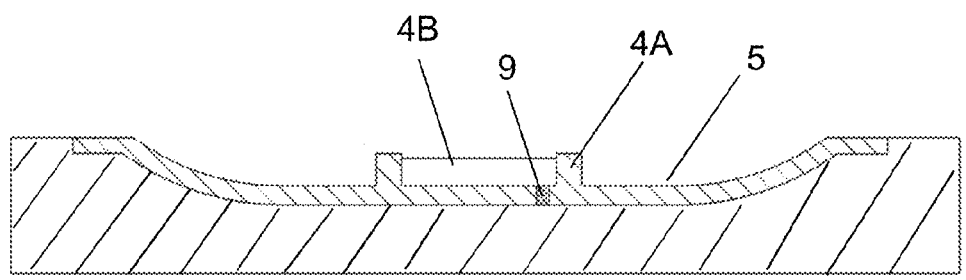
FIG. 4 schematically depicts a view in cross section of the molding element according to a third embodiment.

FIG. 4 depicts a third embodiment in which the first area 9 opens out at the intersection of two protrusions 4A, 4B. The removal of air from the vicinity of the protrusions when the mold is closed over the green tire is thus improved.

Figure 5:
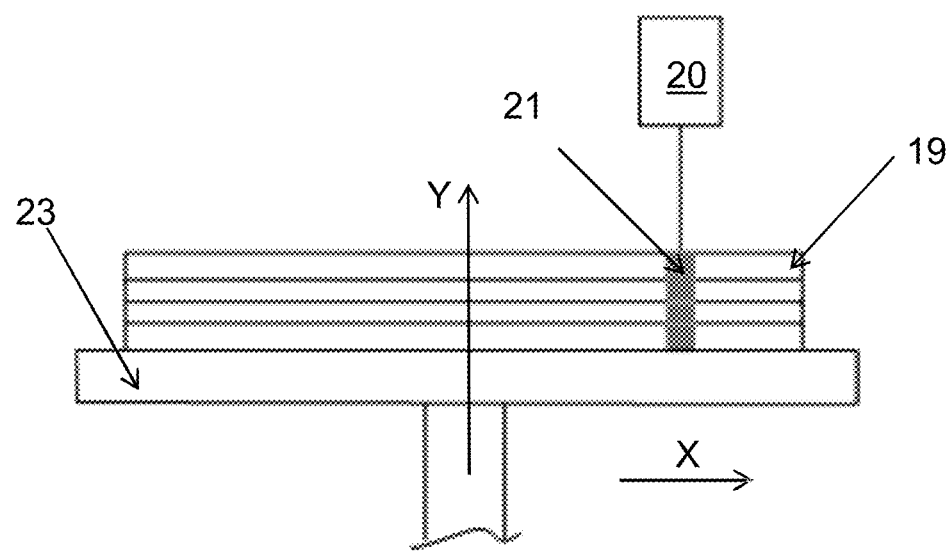
FIG. 5 depicts one step of the method of manufacturing the molding element of FIG. 1.

FIG. 5 shows one step in a method of the layer-by-layer manufacture of the molding element of FIG. 1. This method comprises a plurality of steps of depositing layers 19 of metallic particles and of agglomerating all or some of the particles of these layers by fusion using a laser 20. For each of the layers of the molding element, a porous part 21 is created during the step of agglomerating the particles. The porous parts of the various layers are superposed with one another to form a continuous porous zone extending into the thickness of the molding element. These porous parts may be superposed with one another exactly in the thickness of the molding element as is depicted in FIG. 5. As an alternative, there may be an offset between the porous parts in a direction X perpendicular to the axis of symmetry Y of a support plate 23 supporting the various layers 19.

In order to generate these various porous parts it is possible to modify certain parameters of the laser 20 during the agglomeration by fusion of the layers. For example, it is possible to modify the laser speed and/or the diameter of the laser beam and/or the power of this laser and/or the separation of the vectors of the laser.

The invention is not restricted to the examples described and depicted and various modifications can be made thereto without departing from its scope.

FIG. 1 depicts the first porous area as forming a disc on the first surface of the molding element. As an alternative, the first porous area forms a marking intended to mold a pattern of the logo, word or some other type, on this first porous area.

The invention claimed is:

1. A molding element for a tire mold manufactured from a metallic powder fused together layer by layer, the molding element comprising:
    a first surface adapted to mold all or part of a tread surface of the tire,
    a second surface opposite to the first surface and adapted to be in contact with another part of the mold,
    wherein the thickness (E) of the molding element is between 1 and 6 millimeters, the molding element overall having a density greater than or equal to 98%, and
    at least one first porous area extending into the thickness of this molding element, this first porous area comprising a plurality of pores allowing air to pass between the first surface of the molding element and the second surface thereof.

2. The molding element according to claim 1, wherein the first porous area forms a marking on the molding element, this marking being adapted to mold a pattern on the tire.

3. The molding element according to claim 1, further comprising:
    a lateral surface connecting the first surface to the second surface, and
    a second area extending from the first porous area of the molding element to the lateral surface, wherein the second porous area forming all or part of the second surface of the molding element.

4. The molding element according to claim 1, further comprising a plurality of protrusions projecting from the first surface and adapted to mold cuts in the tread of the tire, wherein at least two protrusions of the plurality of protrusions intersect on this first surface, wherein the first porous area opens onto the first surface at the intersection of the two protrusions.

5. A method for the layer-by-layer manufacture of a molding element for a tire mold, the molding element comprising a first surface adapted to mold all or part of a tread surface of the tire and a second surface opposite to the first surface and adapted to be in contact with another part of the mold, the thickness of the molding element being between 1 and 6 millimeters, the molding element overall having a density greater than or equal to 98%, the method of manufacture comprising a plurality of steps of applying layers of metallic particles and of agglomerating all or some of the particles of these layers by fusion, wherein for each of the layers of the molding element, a porous part is created during the step of agglomerating the particles, the porous parts of the various layers of the molding element being superposed with one another to form a continuous porous area extending into the thickness of the molding element.

* * * * *